US012398720B2

(12) United States Patent
Susca et al.

(10) Patent No.: US 12,398,720 B2
(45) Date of Patent: Aug. 26, 2025

(54) DIRECT CONTROLLED VARIABLE DISPLACEMENT VALVES WITH DUAL SET POINT PRESSURE RELIEF

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 62 days.

(21) Appl. No.: 18/202,513

(22) Filed: May 26, 2023

(65) Prior Publication Data

US 2024/0392773 A1    Nov. 28, 2024

(51) Int. Cl.
| F04B 49/22 | (2006.01) |
| F02C 7/22 | (2006.01) |
| F02C 9/30 | (2006.01) |
| F04B 49/00 | (2006.01) |
| F04B 49/035 | (2006.01) |
| F04B 49/06 | (2006.01) |
| F04B 49/24 | (2006.01) |

(52) U.S. Cl.
CPC .............. F04B 49/225 (2013.01); F02C 9/30 (2013.01); F04B 49/002 (2013.01); F04B 49/035 (2013.01); F04B 49/065 (2013.01); F04B 49/246 (2013.01); F02C 7/22 (2013.01)

(58) Field of Classification Search
CPC ........ F04B 49/24; F04B 49/065; F04B 49/16; F04B 7/00; F04B 49/002; F04B 49/08; F04B 2205/11; F04B 2205/09; F04B 49/225; F04B 49/035; F04B 49/246; F02C 7/22; F02C 9/30
See application file for complete search history.

(56) References Cited

U.S. PATENT DOCUMENTS

| 4,602,479 A | 7/1986 | Hansen |
| 5,241,826 A | 9/1993 | Stearns |

(Continued)

FOREIGN PATENT DOCUMENTS

| EP | 4400702 A1 | 7/2024 |
| EP | 4400720 A1 | 7/2024 |

OTHER PUBLICATIONS

Extended European Search Report for corresponding European Patent Application No. 24170212.5, dated Sep. 25, 2024, 8 pgs.

*Primary Examiner* — David N Brandt
(74) *Attorney, Agent, or Firm* — Kinney & Lange, P.A.

(57) ABSTRACT

A system includes a variable displacement pump (VDP) in fluid communication with an inlet line and with an outlet line. The VDP includes a variable displacement mechanism configured to vary pressure to the outlet line. A relief valve (RV) includes an RV inlet in fluid communication with the outlet line, and an RV outlet in fluid communication with a bypass line that feeds into the inlet line upstream of the VDP. An actuator is operatively connected to control the RV to change function of the RV between a first function and a second function. The first function is a high pressure relief valve function. The second function is as a wind milling bypass function. A controller is operatively connected to the actuator to control the RV to change back and forth between the first function and the second function.

14 Claims, 2 Drawing Sheets

(56) References Cited

U.S. PATENT DOCUMENTS

| | | | | |
|---|---|---|---|---|
| 6,102,001 A | * | 8/2000 | McLevige | F02C 9/26 |
| | | | | 123/387 |
| 2008/0289338 A1 | * | 11/2008 | Desai | F04C 14/02 |
| | | | | 60/734 |
| 2012/0315152 A1 | * | 12/2012 | Baker | F02C 7/22 |
| | | | | 417/302 |
| 2018/0340501 A1 | | 11/2018 | Ni et al. | |
| 2022/0372941 A1 | | 11/2022 | Susca et al. | |

* cited by examiner

DIRECT CONTROLLED VARIABLE DISPLACEMENT VALVES WITH DUAL SET POINT PRESSURE RELIEF

BACKGROUND

1. Field

The present disclosure relates to pump systems, and more particularly to variable displacement pump systems, e.g. for fuel and/or actuation systems in aerospace applications.

2. Description of Related Art

Variable displacement pumps can require a large number of control valves to maintain operation of the pump throughout a turbine engine's mission cycle for example. This is due to various factors such as high variations between the flows demand at different stages of a typical mission cycle.

The conventional techniques have been considered satisfactory for their intended purpose. However, there is an ever present need for improved systems and methods for variable displacement pumps. This disclosure provides a solution for this need.

SUMMARY

A system includes a variable displacement pump (VDP) in fluid communication with an inlet line and with an outlet line. The VDP includes a variable displacement mechanism configured to vary pressure to the outlet line. A relief valve (RV) includes an RV inlet in fluid communication with the outlet line, and an RV outlet in fluid communication with a bypass line that feeds into the inlet line upstream of the VDP. An actuator is operatively connected to control the RV to change function of the RV between a first function and a second function. The first function is a high pressure relief valve function. The second function is as a wind milling bypass function. A controller is operatively connected to the actuator to control the RV to change back and forth between the first function and the second function.

The controller can be configured to control the RV to be in the first function if a flow demand input to the controller is greater than a low flow threshold. The controller can be configured to control the RV to be in the second function if flow demand input to the controller is at or below the low flow threshold. The controller can be operatively connected to receive input indicative of flow demanded by the downstream system supplied by the outlet line. The controller can be configured to control the variable displacement mechanism and the RV based on the input indicative of flow demanded by the downstream system supplied by the outlet line.

The RV can include an RV control line connecting the actuator in fluid communication with an actuation piston of the RV. The actuation piston can be operatively connected to a valve member of the RV. The valve member can be engaged in a housing of the RV for sliding relative to the housing between a first position in the first function to block flow from the RV inlet to the RV outlet and a second position in the second function to allow flow from the RV inlet to the RV outlet.

A biasing member can bias the valve member to the first position in the first function but accommodates movement of the valve member to open flow from the RV inlet to the RV outlet for pressure relief if pressure differential between the inlet line and the outlet line exceeds a predetermined high pressure relief threshold. The RV control line can include a branch that connects in fluid communication with the bypass line through a through a fixed throttle or orifice which allows for draining of fluid from control line to accommodate pressure relief movement of the actuation piston.

The actuator can include a solenoid connected in fluid communication between the outlet line and the RV control line, and operatively connected to the controller so the controller can control the RV. An electrohydraulic servo valve (EHSV) having a control port can be connected in fluid communication with the variable displacement mechanism by a VDP control line for control of flow through the VDP, wherein the EHSV is connected in fluid communication with both the inlet line and with the outlet line through respective connection lines, and wherein the EHSV is operatively connected to the controller for active control of the EHSV to actuate the variable displacement mechanism. A position sensor can be operatively connected to the variable displacement mechanism to provide sensor output indicative of position of the variable displacement mechanism. The position sensor can be operatively connected to the controller to provide feedback for controlling the variable displacement mechanism. A pressure sensor can be operatively connected to the outlet line to generate sensor output indicative of pressure in the outlet line. The pressure sensor can be operatively connected to the controller for active control of the variable displacement mechanism based on pressure in the outlet line.

The actuator can includes a unipolar electrohydraulic servo valve (EHSV) having a first control port connected in fluid communication with the variable displacement mechanism by a VDP control line for control of flow through the VDP, wherein the EHSV has a second control port connected in fluid communication with the actuation piston for control of the first and second functions of the RV, wherein the EHSV is connected in fluid communication with both the inlet line and with the outlet line through respective connection lines, and wherein the EHSV is operatively connected to the controller for active control of the EHSV to actuate the variable displacement mechanism. A position sensor can be operatively connected to the variable displacement mechanism to provide sensor output indicative of position of the variable displacement mechanism. The position sensor can be operatively connect the controller to provide feedback for controlling the variable displacement mechanism. A pressure sensor can be operatively connected to the outlet line to generate sensor output indicative of pressure in the outlet line. The pressure sensor can be operatively connected to the controller for active control of the variable displacement mechanism based on pressure in the outlet line.

A method includes receiving input indicative of flow demanded by a downstream system supplied from an outlet line of a variable displacement pump (VDP). The method includes controlling a relief valve (RV) to operate as a high pressure relief valve if the flow demanded by the downstream system is greater than a low flow threshold, and to recirculate flow from the outlet line to an input line in a windmill bypass function of the RV if the flow demanded by the downstream system is at or below the low flow threshold. The method can include receiving sensor data from a pressure sensor in the outlet line, and controlling the a variable displacement mechanism of the VDP to supply the flow demanded by the downstream system with the RV operating as the high pressure relief valve.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
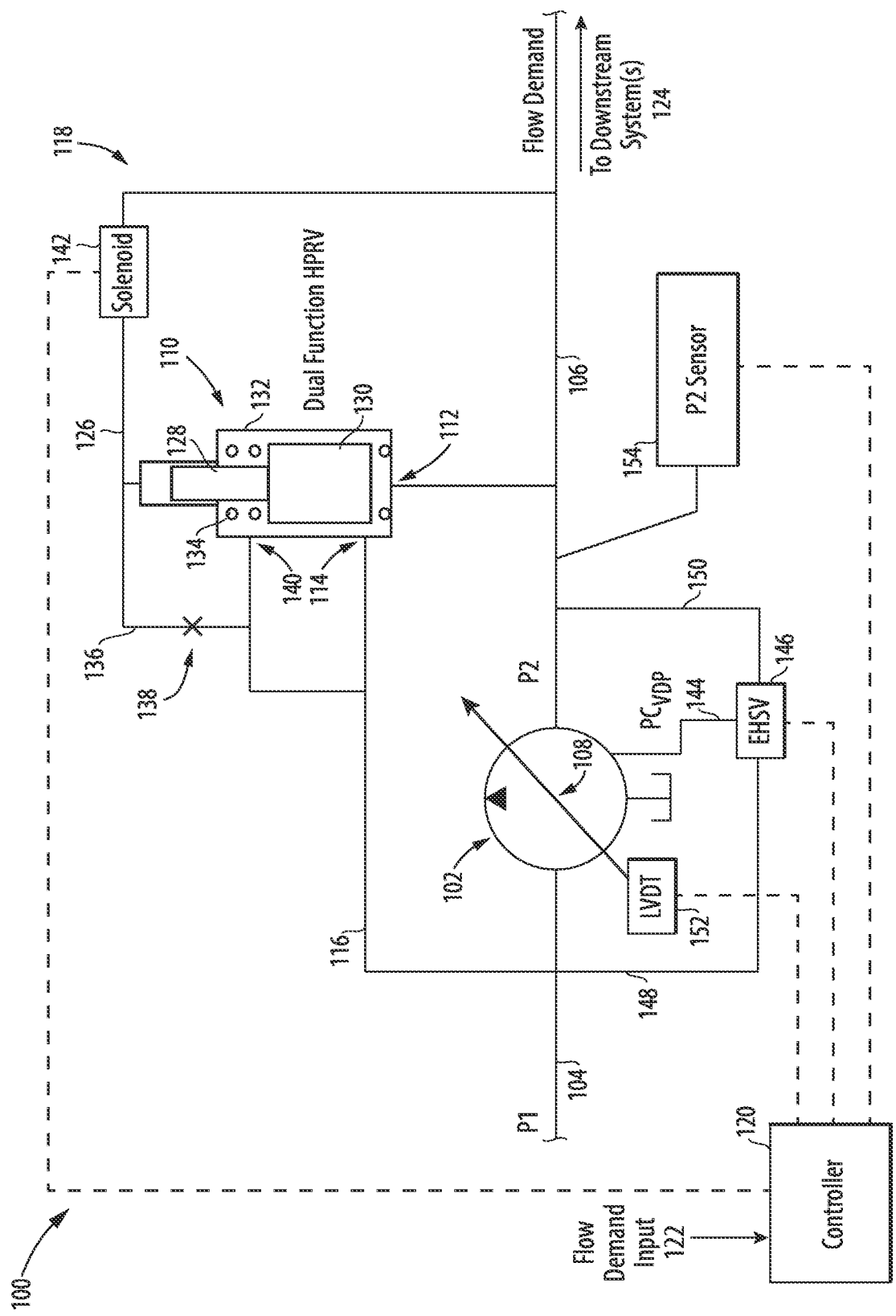
FIG. 1 is a schematic view of an embodiment of a system constructed in accordance with the present disclosure, showing the dual function relief valve connected to a solenoid for actuation.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2, as will be described. The systems and methods described herein can be used to provide high pressure relief and windmill bypass functions with a single relief valve for a variable displacement pump (VDP).

The system 100 includes a VDP 102 in fluid communication with an inlet line 104 and with an outlet line 106. The VDP includes a variable displacement mechanism 108 configured to vary pressure to the outlet line 106. A relief valve (RV) 110 includes an RV inlet 112 in fluid communication with the outlet line 106, and an RV outlet 114 in fluid communication with a bypass line 116 that feeds into the inlet line 104 upstream of the VDP 102. An actuator 118 is operatively connected to control the RV 110 to change function of the RV 110 between a first function and a second function. The first function is a high pressure relief valve (HPRV) function. The second function is as a wind milling bypass function. A controller 120 is operatively connected to the actuator 118 to control the RV 110 to change back and forth between the first function and the second function.

The controller 120 is configured to receive flow demand input 122, i.e. input indicative of flow demanded by one or more downstream systems 124 supplied by the outlet line 106. The controller 120 is configured to control the variable displacement mechanism 108 and the RV 110 based on the input 122 indicative of flow demanded by the downstream system 124 supplied by the outlet line 106. The controller 120 is configured to control the RV 110 to be in the first function, i.e. the HPRV function, if the flow demand input 122 to the controller is for flow greater than a predetermined low threshold. The controller 120 is configured to control the RV 110 to be in the second function, i.e. the windmill bypass function, if flow demand input 122 to the controller 120 is at or below the low threshold, i.e. for low or even zero flow demanded to be supplied to the downstream system or systems 124.

The RV 110 includes an RV control line 126 connecting the actuator in fluid communication with an actuation piston 128 of the RV 110. The actuation piston 128 is operatively connected to a valve member 130 of the RV 110. The valve member 130 is engaged in a housing 132 of the RV 110 for sliding relative to the housing 132 between a first position, i.e. downward as oriented in FIG. 1, in the HPRV function to block flow from the RV inlet 112 to the RV outlet 114, and a second position, i.e. upward as oriented in FIG. 1, in the second function. In windmilling bypass function, the valve member 130 allows flow from the RV inlet 112 to the RV outlet 114, i.e. for windmilling bypass flow from the outlet line 106 to the inlet line 104 when there is no flow demand to keep circulation going through the VDP 102 for cooling the VDP 102.

A biasing member 134 biases the valve member 130 to the first position, i.e. downward in FIG. 1, in the HPRV function but accommodates movement of the valve member, upward in FIG. 1, in the HPRV function to open flow from the RV inlet 112 to the RV outlet 114 for pressure relief if pressure differential between the inlet line 104 and the outlet line 106 exceeds a predetermined high pressure relief threshold. The RV control line 126 includes a branch 136 that connects in fluid communication with the bypass line 116 through a through a fixed throttle or orifice 138 which allows throttling flow coming out of the solenoid 142 when it is open to convert the RV 110 to the HPRV function with pressure on the back side of the piston 128. When the solenoid 142 closes, the pressure in the line 126 reduces to the pressure of the inlet line 104, lowering pressure on the back side of the piston 128 to convert the RV 110 to the windmilling bypass function. There is also a port 140 connected to the bypass line 116 to set a reference pressure on the backside of the valve member 130, so that the reference pressure, biasing member 134 and piston 128 work to set the pressure delta across the VDP 102.

The actuator 118 includes the solenoid 142 connected in fluid communication between the outlet line 106 and the RV control line 126. The solenoid is operatively connected to the controller 120 so the controller 120 can control the functions of the RV 110. An electrohydraulic servo valve (EHSV) 146 has a control port connected in fluid communication with the variable displacement mechanism 108 by a VDP control line 144 for control of flow through the VDP 102. The EHSV 146 is connected in fluid communication with both the inlet line 104 and with the outlet line 106 through respective connection lines 148, 150. The EHSV 146 is operatively connected to the controller 120 for active control of the EHSV 146 to actuate the variable displacement mechanism 108 based on the flow demand input 122 and sensor inputs described below. A position sensor 152 is operatively connected to the variable displacement mechanism 108 to provide sensor output indicative of position of the variable displacement mechanism 108. The position sensor 152 is operatively connected to the controller 120 to provide feedback for controlling the variable displacement mechanism 108. A pressure sensor 154 is operatively connected to the outlet line 106 to generate sensor output indicative of pressure in the outlet line 106. The pressure sensor 154 is operatively connected to the controller 120 for active control of the variable displacement mechanism 108 based on pressure in the outlet line 106.

With reference now to FIG. 1, the actuator 118 includes the EHSV 146, e.g., wherein the EHSV 146 is unipolar. In this case, the EHSV 146 has a second control port connected in fluid communication with the control line 126 and thereby with the actuation piston 128 for control of the first and second functions of the RV 110.

Figure 2:
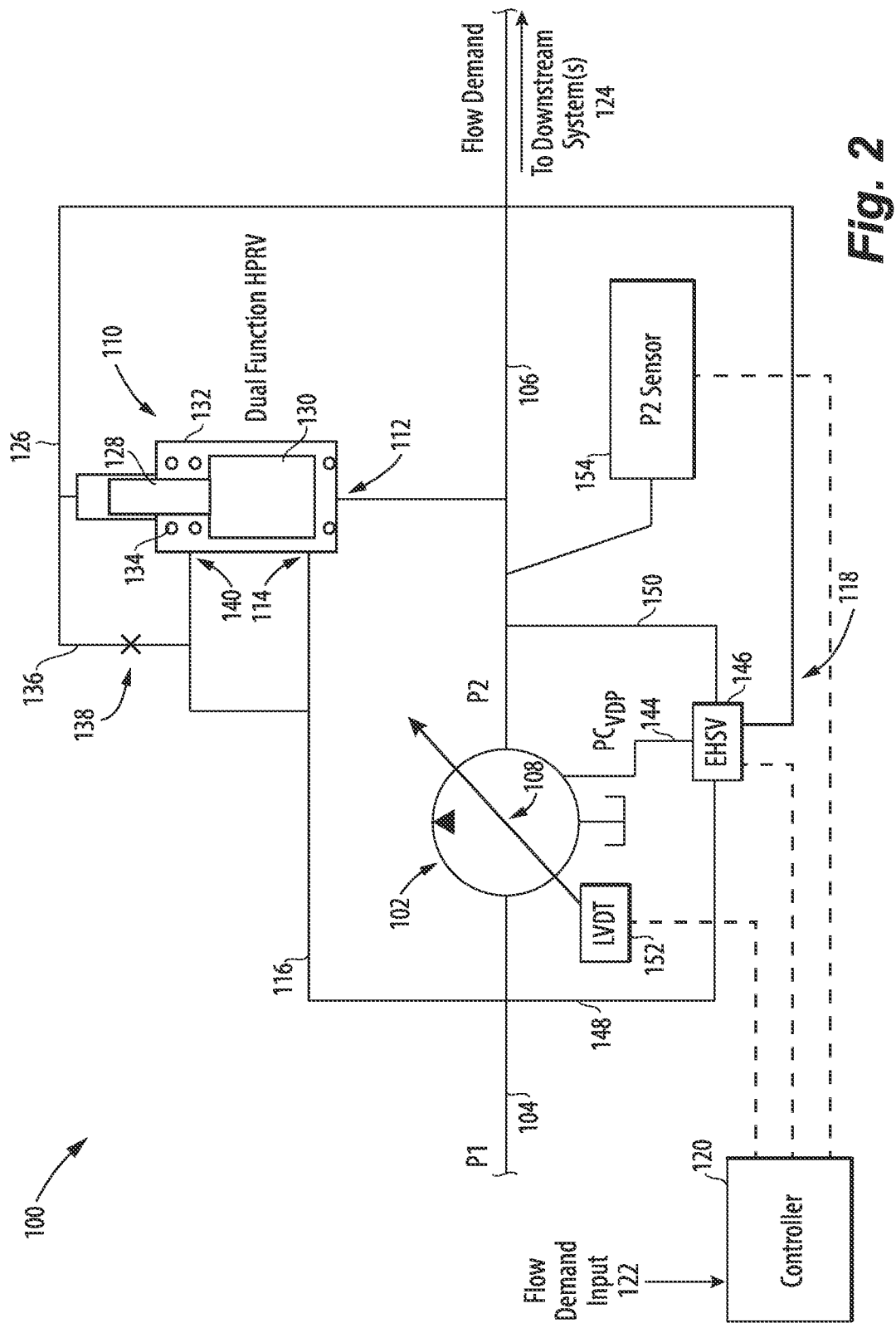
FIG. 2 is a schematic view of an embodiment of the system of FIG. 1, showing a unipolar electrohydraulic servo valve (EHSV) connected to actuate the dual function relief valve.

With reference to FIGS. 1 and 2 a method includes receiving input 122 indicative of flow demanded by a downstream system 124 supplied from an outlet line 106 of the VDP 102. The method includes controlling the RV 108 to operate as a high pressure relief valve (HPRV) if the flow demanded by the downstream system 124 is greater than zero, and to recirculate flow from the outlet line 106 to the input line in a windmill bypass function of the RV 110 if the flow demanded by the downstream system 124 is equal to zero. The method can include receiving sensor data from a pressure sensor 154 in the outlet line 106, and controlling the a variable displacement mechanism 108 of the VDP 102 to supply the flow demanded by the downstream system 124 with the RV 110 operating as the high pressure relief valve.

Using a pressure relief valve with a compensator piston 128, the RV 110 can function as both a windmill bypass valve, e.g. with low pressure to the piston 128, and high pressure relief valve, e.g. with high pressure supplied to the piston 128. The solenoid configuration of FIG. 1 allows the benefit of switching to windmill bypass function during low flow demand operation, i.e. for flow below a predetermined low threshold just over zero flow, to increase pump demand and prevent overheating of the VDP.

Systems and methods as disclosed herein provide potential benefits including the following. They can reduce valve count versus traditional systems. They can reduce the number if input output connections relative to more traditional systems. They can also eliminate the need for a dedicated HPRV and WMBV (windmilling bypass valve) that are used in traditional systems. This reduces the volume of the controls components that surround the pump assembly (e.g. eliminating one valve, and the housing and hydraulic coring required to interact with the eliminated valve) and reduces fuel control leakages (reduces required horsepower/improves pumping efficiency).

The methods and systems of the present disclosure, as described above and shown in the drawings, provide for high pressure relief and windmill bypass functions with a single valve for a variable displacement pump (VDP). While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   an inlet line;
   an outlet line downstream of the inlet line;
   a variable displacement pump (VDP) comprising:
     an inlet fluidically connected to the inlet line; and
     an outlet fluidically connected to the outlet line;
   a relief valve (RV) comprising:
     a housing comprising:
       a first end; and
       a second end;
     a valve member in the housing between the first end and the second end of the housing;
     a biasing member in the housing and biasing the valve member to a first position of the valve member;
     an RV inlet formed in the second end of the housing and fluidically connected to the outlet line downstream of an EHSV inlet connection line;
     an RV outlet formed in the housing and fluidically connected to the inlet line upstream of the VDP by a bypass line, wherein the RV outlet is fluidically connected to the RV inlet when the valve member is in a second position, and the RV outlet is fluidically disconnected from the RV inlet when the valve member is in the first position; and
     an RV port formed in the first end of the housing and fluidically connected to the bypass line;
   an orifice fluidically between the RV port and the bypass line;
   an actuator comprising:
     an actuator inlet fluidically connected to the outlet line; and
     an actuator outlet fluidically connected to the RV port by an RV control line;
   a controller operatively connected to the actuator to selectively fluidically connect the actuator inlet to the actuator outlet.

2. The system as recited in claim 1, wherein the RV control line includes a branch that fluidically connects the RV port with the bypass line through the orifice which allows for draining of fluid from the RV control line to the inlet line to accommodate pressure relief movement of an actuation piston of the RV.

3. The system as recited in claim 1, wherein the actuator includes a solenoid connected in fluid communication between the outlet line and the RV control line, and operatively connected to the controller so the controller can control the RV.

4. The system as recited in claim 3, further comprising:
   an electrohydraulic servo valve (EHSV) comprising:
     an EHSV inlet fluidically connected to the outlet line downstream of the VDP by the EHSV inlet connection line;
     an EHSV outlet fluidically connected to the inlet line upstream of the VDP by an EHSV outlet connection line; and
     a control port fluidically connected to a VDP control line.

5. The system as recited in claim 4, wherein a position sensor is operatively connected to the controller to provide feedback for controlling the variable displacement pump.

6. The system as recited in claim 5, further comprising a pressure sensor operatively connected to the outlet line to generate sensor output indicative of a pressure in the outlet line, wherein the pressure sensor is operatively connected to the controller for active control of the variable displacement pump based on the pressure in the outlet line.

7. The system as recited in claim 2, further wherein the actuator includes a unipolar electrohydraulic servo valve (EHSV) having a first control port connected in fluid communication with a VDP control line for control of flow through the VDP, wherein the EHSV is connected in fluid communication with both the inlet line and with the outlet line through respective connection lines, and wherein the EHSV is operatively connected to the controller for active control of the EHSV.

8. The system as recited in claim 7, wherein a position sensor is operatively connected to the controller to provide feedback for controlling the variable displacement pump.

9. The system as recited in claim 8, further comprising a pressure sensor operatively connected to the outlet line to generate sensor output indicative of a pressure in the outlet line, wherein the pressure sensor is operatively connected to the controller for active control of the variable displacement pump based on the pressure in the outlet line.

10. The system as recited in claim 1, wherein the bypass line fluidically connects the RV port and a reference pressure port to the inlet line.

11. The system as recited in claim 1, wherein the housing of the RV comprises:
  a spring chamber;
  a fluid chamber, wherein the valve member is between the spring chamber and the fluid chamber; and
  an actuation piston connected to the valve member opposite the fluid chamber, wherein the actuation piston and the valve member move together from the first position to the second position.

12. The system as recited in claim 11, wherein the biasing member is in the spring chamber and around the actuation piston.

13. The system as recited in claim 11, wherein the RV comprises:
  a reference port fluidically connecting the spring chamber to the bypass line.

14. A system comprising:
  an inlet line;
  an outlet line downstream of the inlet line;
  a variable displacement pump (VDP) comprising:
    an inlet fluidically connected to the inlet line; and
    an outlet fluidically connected to the outlet line;
  a relief valve (RV) comprising:
    a housing comprising:
      a spring chamber; and
      a fluid chamber;
    a valve member in the housing between the spring chamber and the fluid chamber;
    a biasing member in the spring chamber;
    an actuation piston connected to the valve member opposite the fluid chamber;
    an RV inlet fluidically connected to the outlet line downstream of an EHSV inlet connection line;
    an RV outlet fluidically connected to the inlet line upstream of the VDP by a bypass line, wherein the RV outlet is fluidically disconnected from the RV inlet when the valve member is in a first position and the RV outlet is fluidically connected to the RV inlet when the valve member is in a second position; and
    an RV port formed in the housing and fluidically connecting the actuation piston to the bypass line;
  an orifice fluidically connecting the RV port and the bypass line; an actuator comprising:
    an actuator inlet fluidically connected to the outlet line; and
    an actuator outlet fluidically connected to the RV port by an RV control line; and
  a controller operatively connected to the actuator to selectively fluidically connect the actuator inlet to the actuator outlet.

* * * * *